United States Patent
Slocum et al.

(10) Patent No.: US 6,816,262 B1
(45) Date of Patent: Nov. 9, 2004

(54) COLORIMETER HAVING FIELD PROGRAMMABLE GATE ARRAY

(75) Inventors: David Slocum, Yardley, PA (US); Justin R. Louise, Liverpool, NY (US); Cormic K. Merle, Rochester, NY (US); John A. Boles, Fishers, NY (US); Jay M. Eastman, Pittsford, NY (US); William J. Fox, Rochester, NY (US); Roger J. Greenwald, San Diego, CA (US); Robert J. Hutchinson, Pittsford, NY (US)

(73) Assignee: Colorvision Administrative AG, Lucerne (CH)

( * ) Notice: Subject to any disclaimer, the term of this patent is extended or adjusted under 35 U.S.C. 154(b) by 193 days.

(21) Appl. No.: 09/650,182

(22) Filed: Aug. 29, 2000

Related U.S. Application Data

(63) Continuation-in-part of application No. 09/360,051, filed on Jul. 23, 1999, now Pat. No. 6,163,377.

(51) Int. Cl.⁷ ............................................... G01N 21/25
(52) U.S. Cl. ...................................... 356/416; 356/419
(58) Field of Search ............................... 356/405, 416, 356/419, 418; 348/272, 273, 280, 268

(56) References Cited

U.S. PATENT DOCUMENTS

| | | | | |
|---|---|---|---|---|
| 3,825,342 A | * | 7/1974 | Lubbers et al. ............... 356/41 |
| 4,134,683 A | * | 1/1979 | Goetz et al. ................ 356/407 |
| 5,191,409 A | * | 3/1993 | Hamaguchi et al. ......... 348/242 |
| 5,760,607 A | * | 6/1998 | Leeds et al. .................. 326/38 |
| 6,163,377 A | * | 12/2000 | Boles et al. ................ 356/402 |
| 6,226,034 B1 | * | 5/2001 | Katayama ................... 348/242 |

* cited by examiner

*Primary Examiner*—Zandra V. Smith
(74) *Attorney, Agent, or Firm*—Moser, Patterson & Sheridan, LLP; Kin-Wah Tong

(57) ABSTRACT

A colorimeter capable of calibrating color monitors, whether having cathode ray tube or liquid crystal (LCD) displays, is provided by a photometric array of photodetector and optical filter pairs. The filters include long-pass, edge filters which cover overlapping regions at the upper end of the visible spectrum and a filter which covers the entire visible spectrum. The outputs of the photodetectors are digitally synthesized to provide a response which mimics the response established by the Commission Internationale de l'Eclairage (CIE) xyz (bar) functions almost perfectly. The response which is mimicked may be represented by the CIE color matching functions. The pairs and the associated components are mounted on a printed circuit board captured in a clamshell housing and having an array of apertures which define angularly constrained fields of view of a surface from which the light, to be colormetrically analyzed, emanates. The printed circuit board includes a field programmable gate array programmed to read data from the plurality of filter/detector pairs in parallel. The colorimeter is capable generally of measuring the color characteristics, especially the color temperatures of radiation radiating and reflecting bodies (sources), including so-called black bodies.

13 Claims, 18 Drawing Sheets

COLORIMETER HAVING FIELD PROGRAMMABLE GATE ARRAY

CROSS REFERENCE TO RELATED APPLICATIONS

The present application is a continuation-in-part of U.S. application Ser. No. 09/360,051 filed Jul. 23, 1999 and now U.S. Pat. No. 6,163,377 issued Dec. 19, 2000.

BACKGROUND

The present invention relates to calorimeters for measuring the color content of light and has a response mimicking the response to color of the human eye, as may be represented by the CIE color matching functions. The invention is especially suitable for calibrating color monitors and color video displays, whether of the cathode ray tube or LCD type. The invention is also applicable generally for measuring the color characteristics of other sources (emissive or reflective) of illumination, such as the color temperature thereof.

It has been discovered in accordance with the invention that a colormetric response which accurately mimics the response to color of the human eye can be modeled with edge filters which pass the upper end of the visible spectrum and which are in overlapping relationship, when such filters are paired with photodetectors. The response can be digitally synthesized from the output of the photodetectors, The measurements made with the colorimeter may be used to calibrate a color monitor or display, utilizing techniques known in the art. The mechanical and electrical design makes the inventive colorimeter readily manufacturable at cost competitive with contemporary colorimeters, and also usable in a way compatible with the use of such contemporary colorimeters.

Accurate colorimetry has not been provided by contemporary calorimeters suitable for use by non-technical users and outside of a laboratory environment. As discussed in the text Measuring Colour, Second Edition by R. W. G. Hunt (published by Ellis Horwood Limited, 1991), contemporary colorimeters using filtered photo cells have not provided accurate colorimetry in that ". . . it is usually impossible to find filters that, when combined with the spectral sensitivity of the unfiltered photo cell, result in a perfect match to the $\bar{x}(\lambda)$, $\bar{y}(\lambda)$, and $\bar{z}(\lambda)$ functions." Also as discussed in the Hunt text, even with narrow intervals over the visible spectrum and even with the use of optimized weights to minimize errors, accurate colorimetry 30 has not been achieved. (See, pages 178–181 of the Hunt text). Such calorimeters as discussed by Hunt are represented by Vincent, U.S. Pat. No. 5,272,518, issued Dec. 21, 1993, Suga, U.S. Pat. No. 4,150,898, issued Apr. 24, 1979, and Lutz, et al., U.S. Pat. No. 5,168,320, issued Dec. 1, 1992.

The present invention provides an improved filter colorimeter which utilizes edge filter as well as digital processing and enhancement to provide a response which mimics the human eye response so as to obtain accurate colorimetry.

The colorimeter provided by the invention also improves accuracy of colorimetry through the use of apertures which baffle the light being measured and limit off color, high angle emissions, which are common from LCD displays.

The mechanical and electro-optical structure of the calorimeter provided by the invention enables it to be used in a manner compatible with contemporary colorimeters, as well as to be manufacturable at a sufficiently low cost to be priced competitively with such colorimeters.

SUMMARY OF THE INVENTION

In accordance with the present invention, a color measuring device is provided The device includes a plurality of photodetectors for measuring light signals. A field programmable gate array coupled to the photodetectors reads data from the photodetectors in parallel.

In accordance the a more limited aspect of the present invention, the color measuring device includes a plurality of optical filter/photodetector pairs, preferably in an array in which each pair receives light over a field of view which is limited. Generally, the field of view is angularly constrained so as to prevent color-distorted, higher angle rays or emissions from the emissive surface from reaching the photodetectors. The pairs have a responsivity which extends over a different overlapping wavelength region at long wavelength ends of the visible spectrum. Edge filters may be used together with photodetectors, preferably providing digital outputs to obtain this responsivity. A translator which digitally processes the photodetector outputs converts the responsivity of the pairs into a responsivity mimicking the color matching functions representing the responsivity of the human eye. These may be the CIE Commission Internationale de l'Eclairage $\bar{x}$, $\bar{y}$, and $\bar{z}$ functions from which the CIE tri-stimulus values, X, Y, Z, may be obtained by conventional processing of the functions (See, for example, the Vincent patent cited above and McLaughlin, U.S. Pat. No. 5,499,040, issued Mar. 12, 1996), thereby facilitating the use of the colorimeter for calibrating color monitors and color video and other displays.

BRIEF DESCRIPTION OF DRAWINGS

The foregoing and other features and advantages of the invention will become more apparent from a reading of the following description in connection with the accompanying drawings in which.

DETAILED DESCRIPTION

Figure 1:
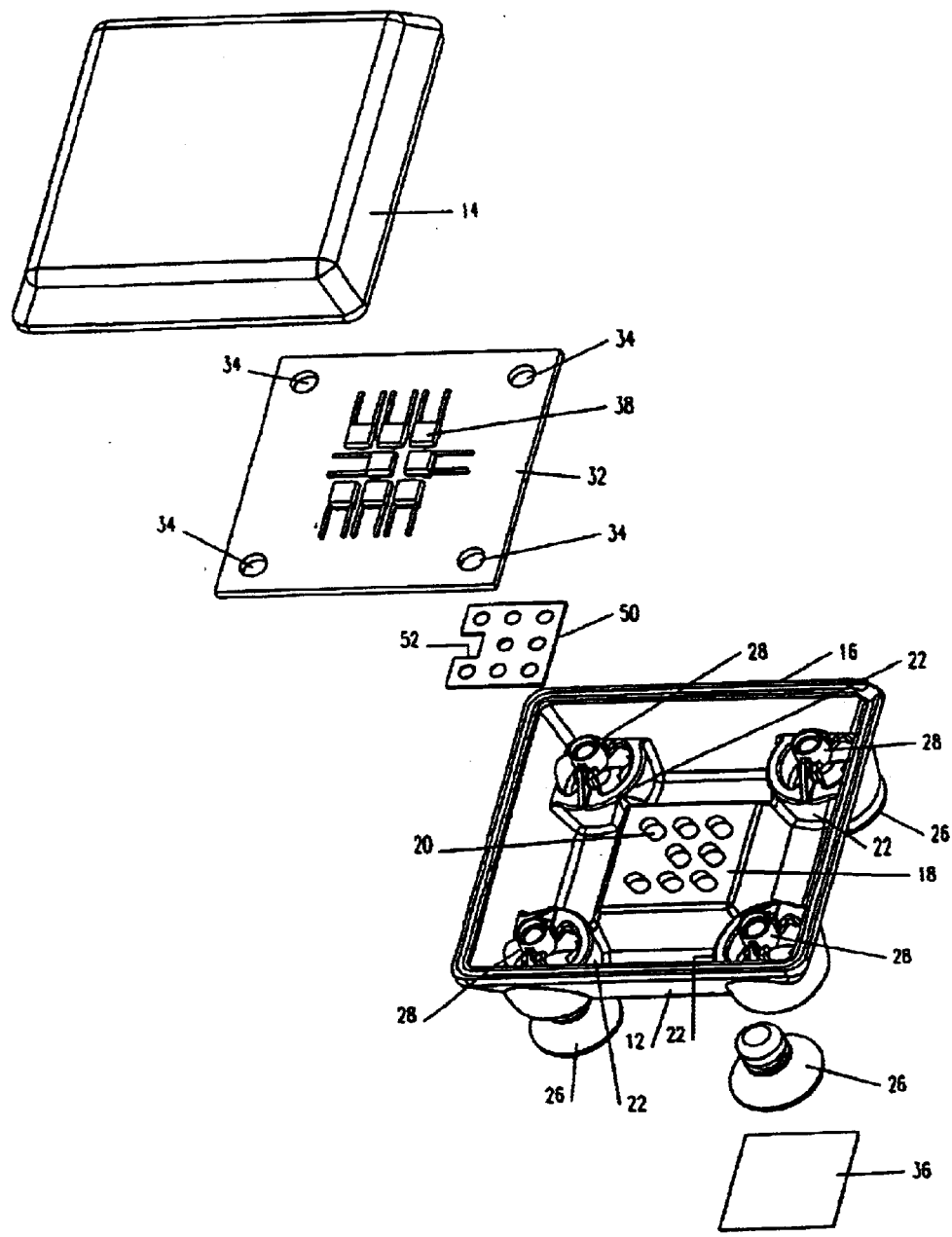
FIG. 1 is an exploded view in perspective showing the principal components of a colorimeter in accordance with the presently preferred embodiment of the invention.
Figure 1A:
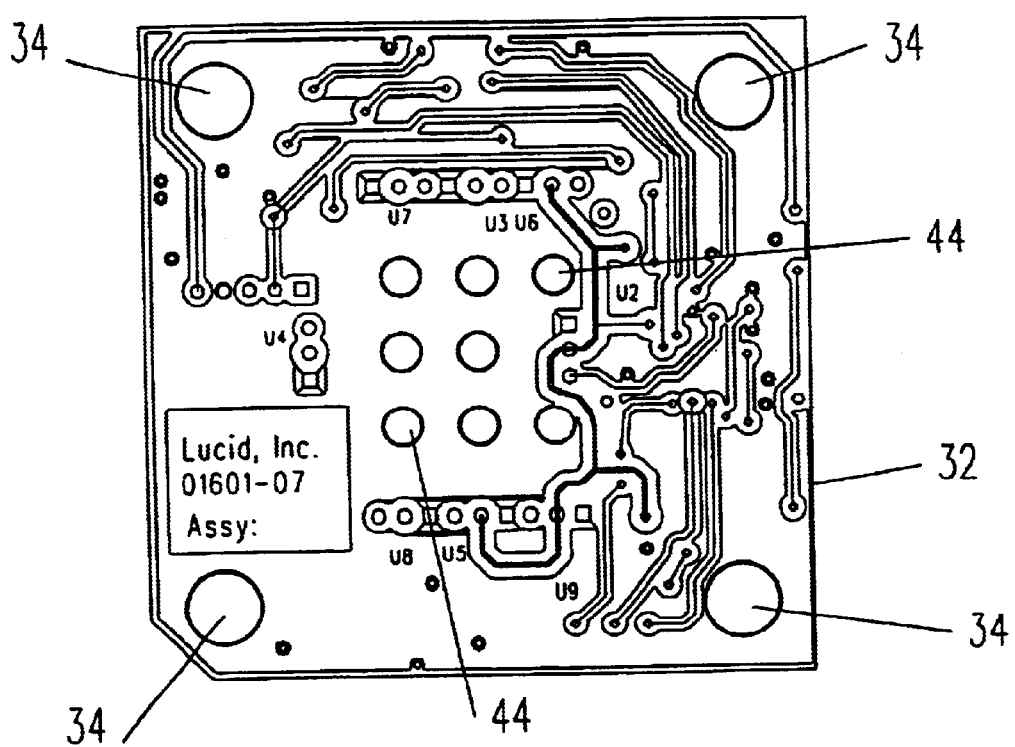
FIG. 1A is a plan view of the printed circuit board component shown in FIG. 1.

Referring to FIGS. 1, 1A, 2, 3, 4 and 5, there is shown a colorimeter embodying the invention, the colorimeter is a unitary assembly of a housing 10 made up of a front shell 12 and a rear shell 14 which are joined at a tongue and groove connection 16. A generally rectangular recessed wall 18 has a matrix of apertures 20 which may be evenly spaced from each other by the same distances along X and Y coordinates paralleling perpendicular edges of the wall 18. In the illustrated embodiment, the shape of the apertures is oblong and their longitudinal axes are at approximately 45° to the X and Y coordinates, that is to the edges of the wall 18. The longitudinal axis is arranged, when the colorimeter is in use in making colorimeter measurements of a color monitor screen, at approximately 45° from horizontal. This enables sufficient light (photons) to pass through the aperture even with limited fields of view. Such limitation in the field of view is discussed in connection with FIGS. 6 and 7 below. Generally, the fields of view of each of the apertures 20 are designed to avoid cross-talk between different photodetector 38 and filters 50 (discussed in greater detail below). The constrained fields of view avoid the effect of color changes with angle, especially in the vertical direction which occurs with LCD screens. It has been found that oblong apertures with parallel sides and circular ends in the orientation discussed above, suitably restrict the fields of view.

The front shell 12 has features 22 projecting inwardly at each of the four corners of the shell 12. These features have circular tongues 24 which capture retaining grooves in soft, rubber suction cups 26. The suction cups provide light pressure against the screen of color monitor or 25 display, from which light enters the calorimeter via the apertures 20.

Tubular posts 28 are molded of the same plastic material as the shell 16 and have axes extending generally perpendicular to the wall 18 and are parallel to the optical axes through the apertures 20. These posts receive complimentary posts 30 which fit inside the posts 28 at the ends thereof. A plate provided by a printed circuit board 32 has circular holes 34 through which the posts 28 enter and capture the board 32 between the shells 12 and 14 when the shells are assembled together. Blind holes 34 in the posts 30 may be threaded and screws (not shown) which enter through the holes in the posts 28 are received in the threaded holes 34 for holding the colorimeter components assembled. A transparent film or sheet 36 is disposed over the front side of the wall 18 and closes the apertures 20. The tongue and groove connection 16 and the sheet 36 thus provide a closed body which is light-tight, except for light which passes through the sheet 36 and apertures 20 for measurement by the colorimeter.

The printed circuit board has an array of photodetectors 38 matching the array of apertures 20 in number and positional relationship. Extending from the back wall of the shell 14 are a matrix of ribs 40, some of which, 42, extend a distance sufficient to bring these ribs 42 into contact with the backside of the printed circuit board 32. These ribs 42 form generally rectangular compartments which enclose the photodetectors 38 and prevent leakage of light therebetween, thereby further eliminating crosstalk between light passing through the apertures 20 and reaching the photodetectors 38. The ribs 40 also serve to strengthen the shell 14.

The photodetectors 38 are preferably light-to-frequency converters which. combine a photodiode and a current-to-frequency converter on a single chip. Such devices are available from Texas Instruments of Dallas, Tex., under such part numbers as TSL 235. They provide digital outputs (pulse trains), the repetition rate or frequency of which is proportional to light level.

Figure 2:
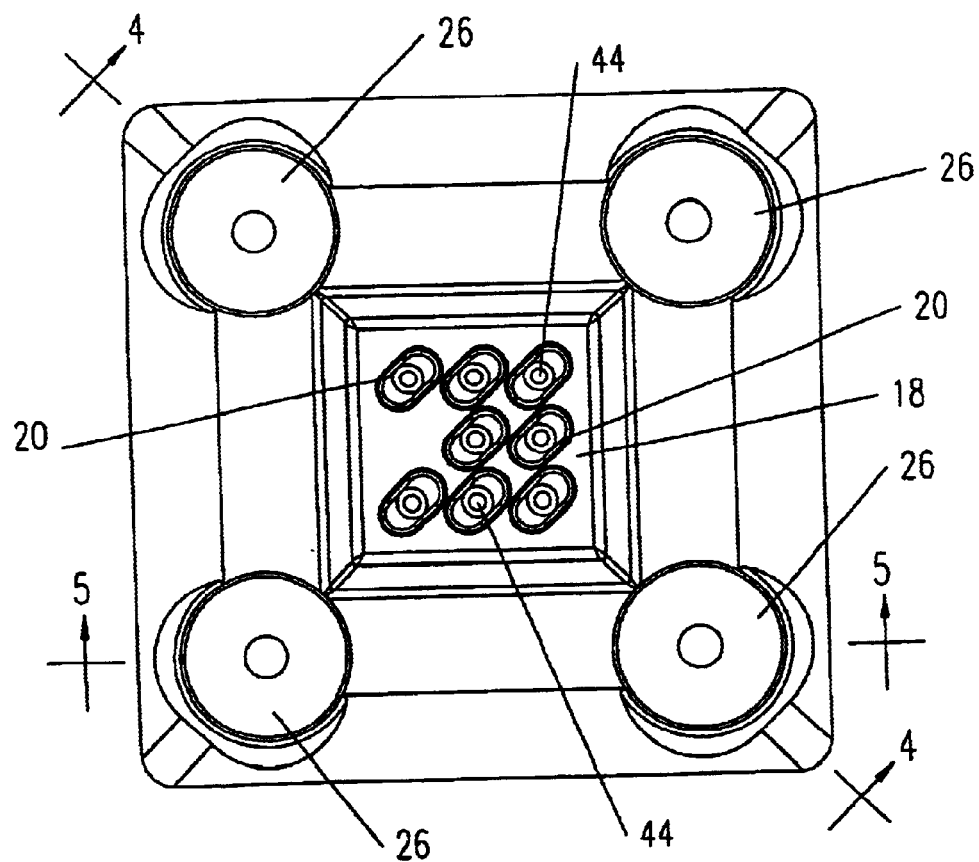
FIG. 2 is a bottom view of the colorimeter shown in FIG. 1.
Figure 3:
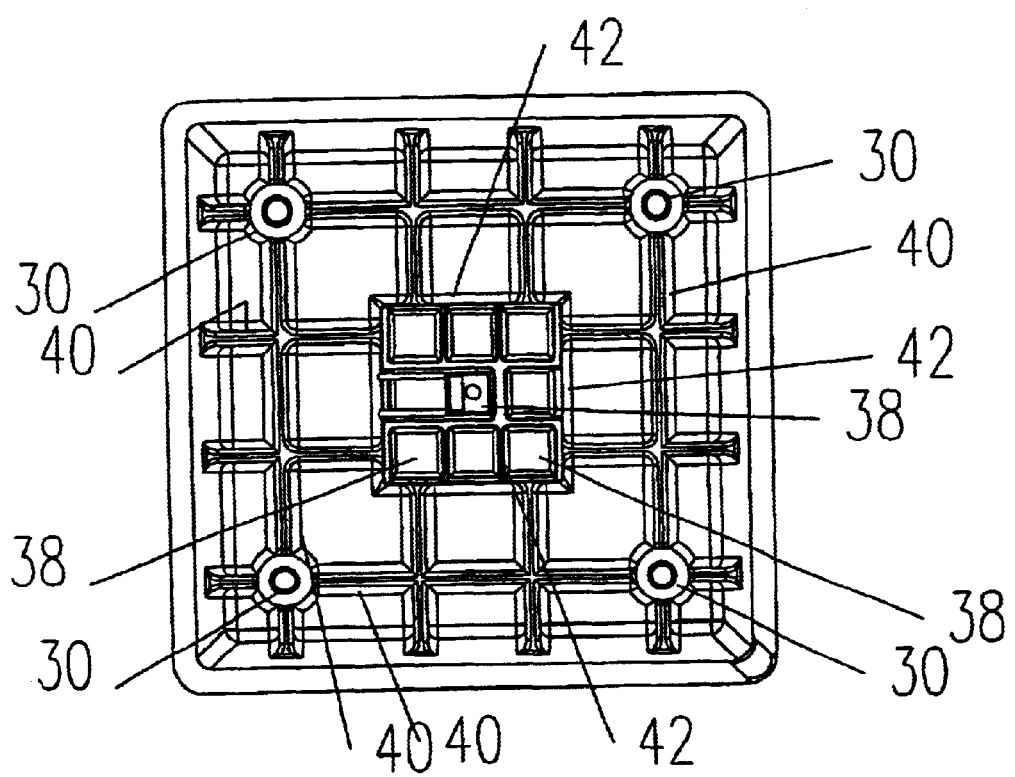
FIG. 3 is a sectional view of the colorimeter shown in FIGS. 1 and 2, the section being taken along the line 3—3 in FIG. 4.
Figure 4:
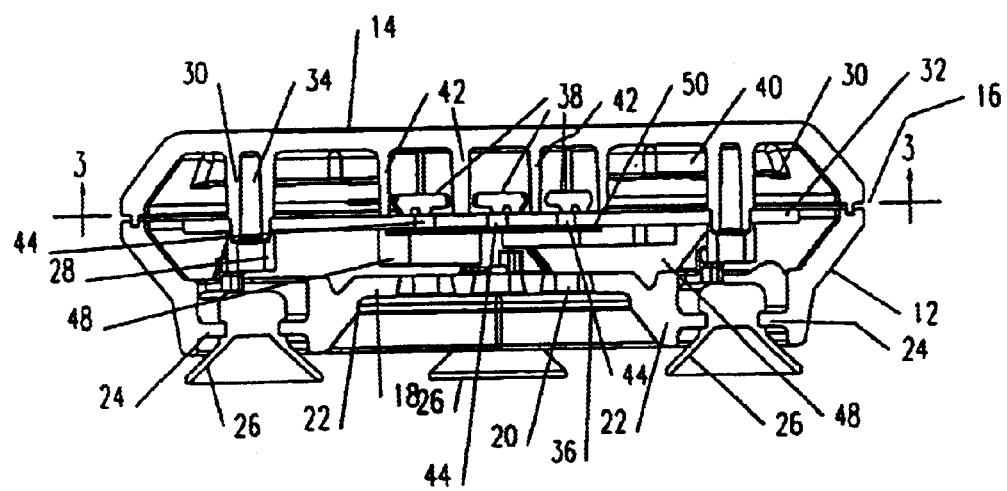
FIG. 4 is a sectional view of the colorimeter shown in FIG. 1, the section being taken along the line 4—4 in FIG. 2.
Figure 5:
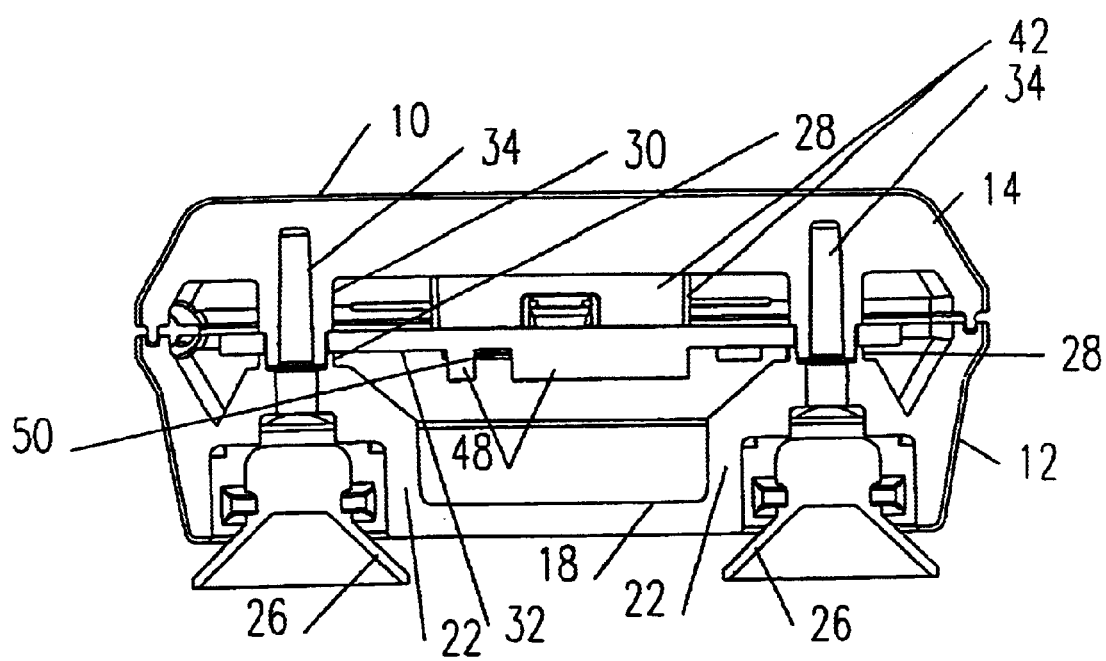
FIG. 5 is a sectional view of the colorimeter show in the preceding figures, the section being taken along the line 5—5 in FIG. 2.
Figure 8:
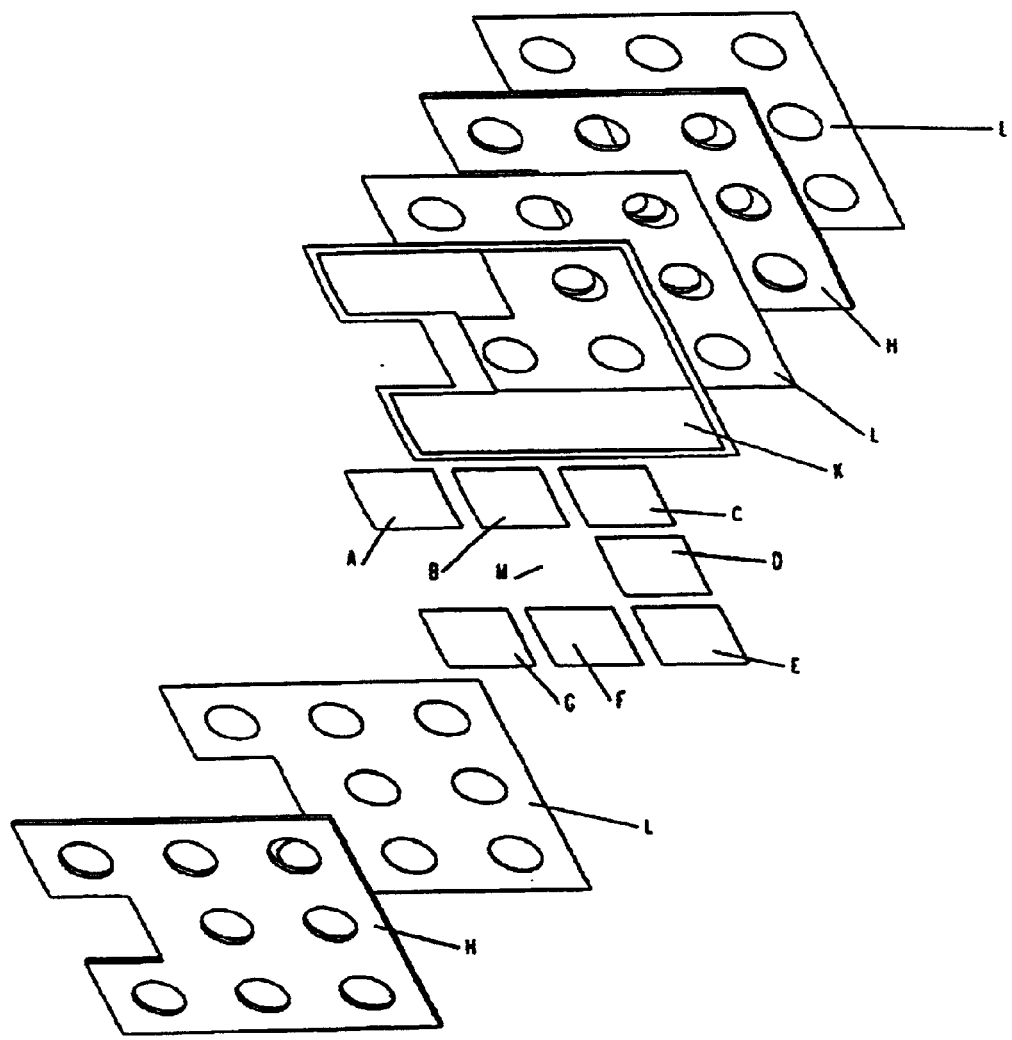
FIG. 8 is an exploded view in perspective of the filter wilt used in the colorimeter shown in the preceding figures.
Figure 9:
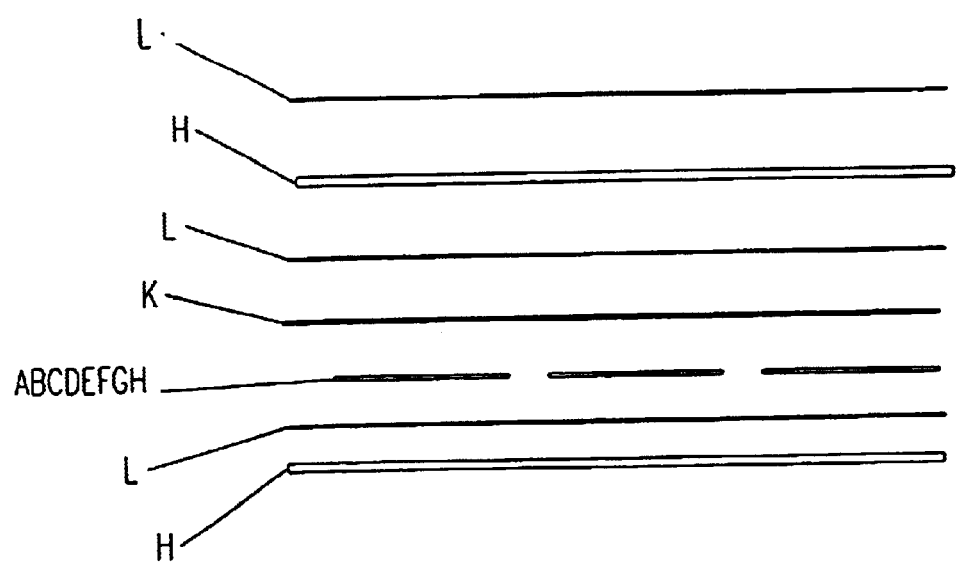
FIG. 9 is a sectional view of the filter unit illustrating the laminated relationship of the layers thereof.

The printed circuit board 32 has an array of openings 44 which are in the same spatial relationship as the apertures 20 and are disposed along optical axes through the center of the apertures 20, as may be observed in FIG. 2 as well as in FIG. 4. The board 32 has printed wiring and electrical components, such as resistors and integrated circuit (IC) chips 48, mounted on the side of the board 32 facing the apertures 20. The photodetectors 38 are mounted on the opposite side of the board. An optical filter pack 50 is mounted on the side of the board 32 facing the apertured wall 18. The filter pack is a laminated, layered structure which is illustrated in FIGS. 8 and 9. There are 7 sheets of filter material, A to G. These may be composed of gelatin and each provides a different long-pass or edge-type optical filter. Such gelatin filters are much lower in cost than thin-film filters which are used in most contemporary colorimeters. Filters employing transmissive colored inks may also be used. The filters are retained in a layered structure having openings in like positional relationship to the apertures 18 and the holes 44 so that when the filter 50 is mounted on the board 32, the filter elements A through G are aligned with different ones of the holes. One of the holes in the layers laminated with the elements A to G is over an unmasked area M. This is the area and the hole 44 in aperture 20 approximately in the middle of the filter array. In one of the layers H, the notch 52 provides edges which facilitate placement and alignment of the filter pack 50 on the board 32.

The layers, which constitute the pack, are opaque (e.g., are black) layers H of a material such as polycarbonate sheet which are on the outside of the pack. One of these layers faces downwardly and the other may be covered by an adhesive layer L on the outside of the back The adhesive may be a pressure-sensitive adhesive, which itself may be covered by release material so as to facilitate assembly of the filter pack 50 on the board 32. There is another adhesive layer which holds the filter elements A through G assembled with the front opaque layer H. There is a transparent layer K and an additional adhesive layer L in back of the transparent layer K and in front of the rear opaque layer H. With a suitable alignment tool, the layers may be laid up and pressed together so as to provide the filter pack 50. The filter pack may be reproduced in quantity, reliably and with accurate spacings and tolerances.

Figure 6:
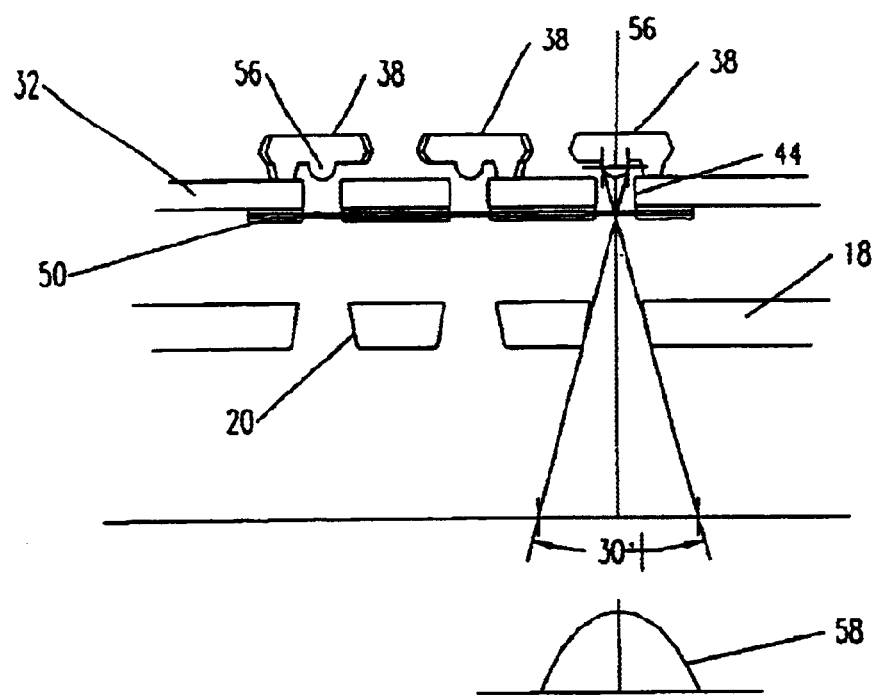
FIGS. 6 and 7 are ray diagrams illustrating how the apertures in the wall of the colorimeter through which light passes masks and restricts the field of view of the filter/photodetector pairs.
Figure 7:
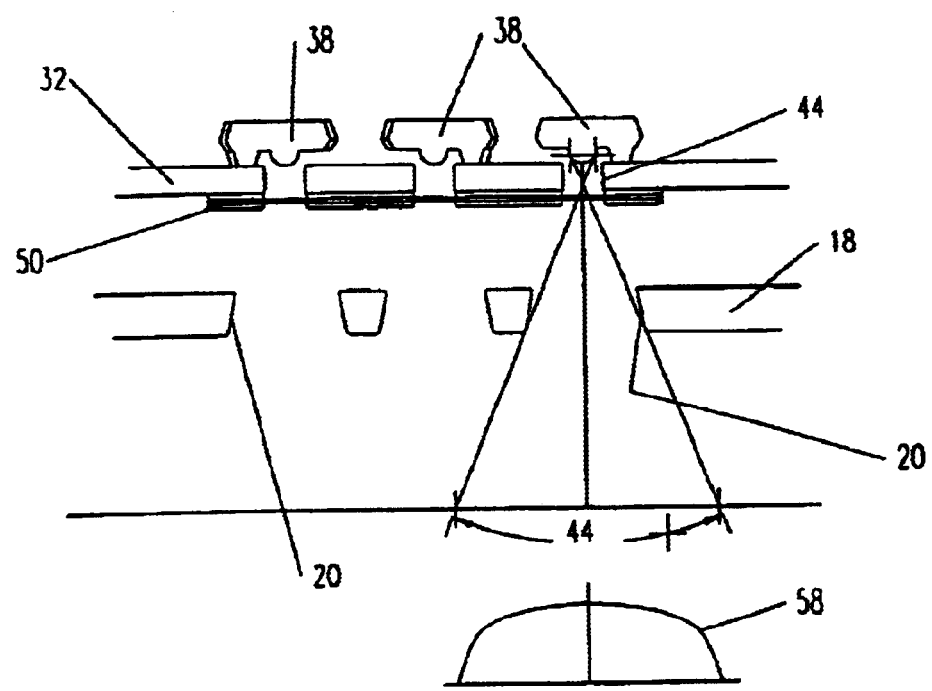
Figure 10:
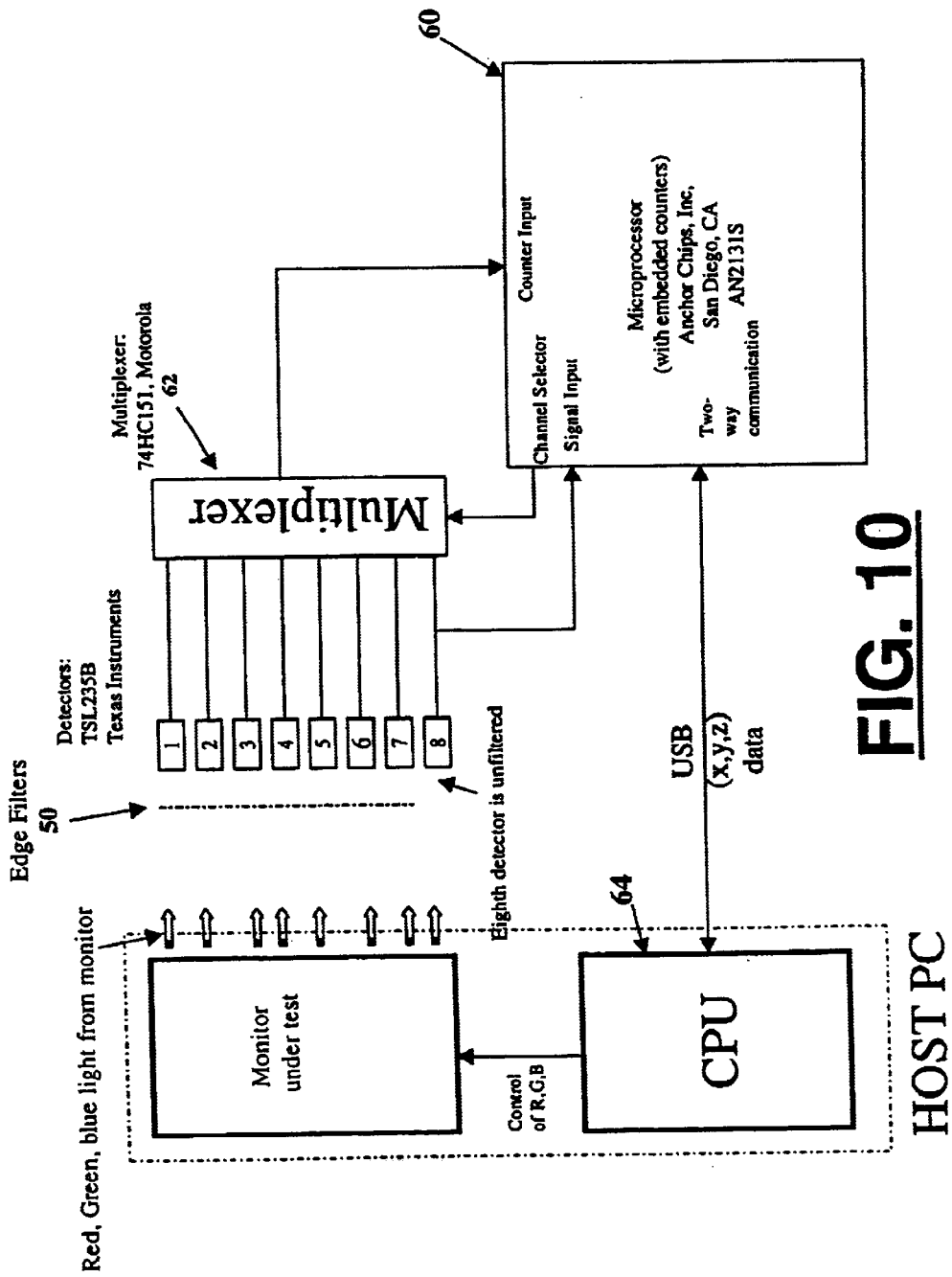
FIG. 10 is a block diagram schematically showing the circuitry of the colorimeter and the system for calibrating a monitor utilizing the outputs from the colorimeter.
Figure 11:
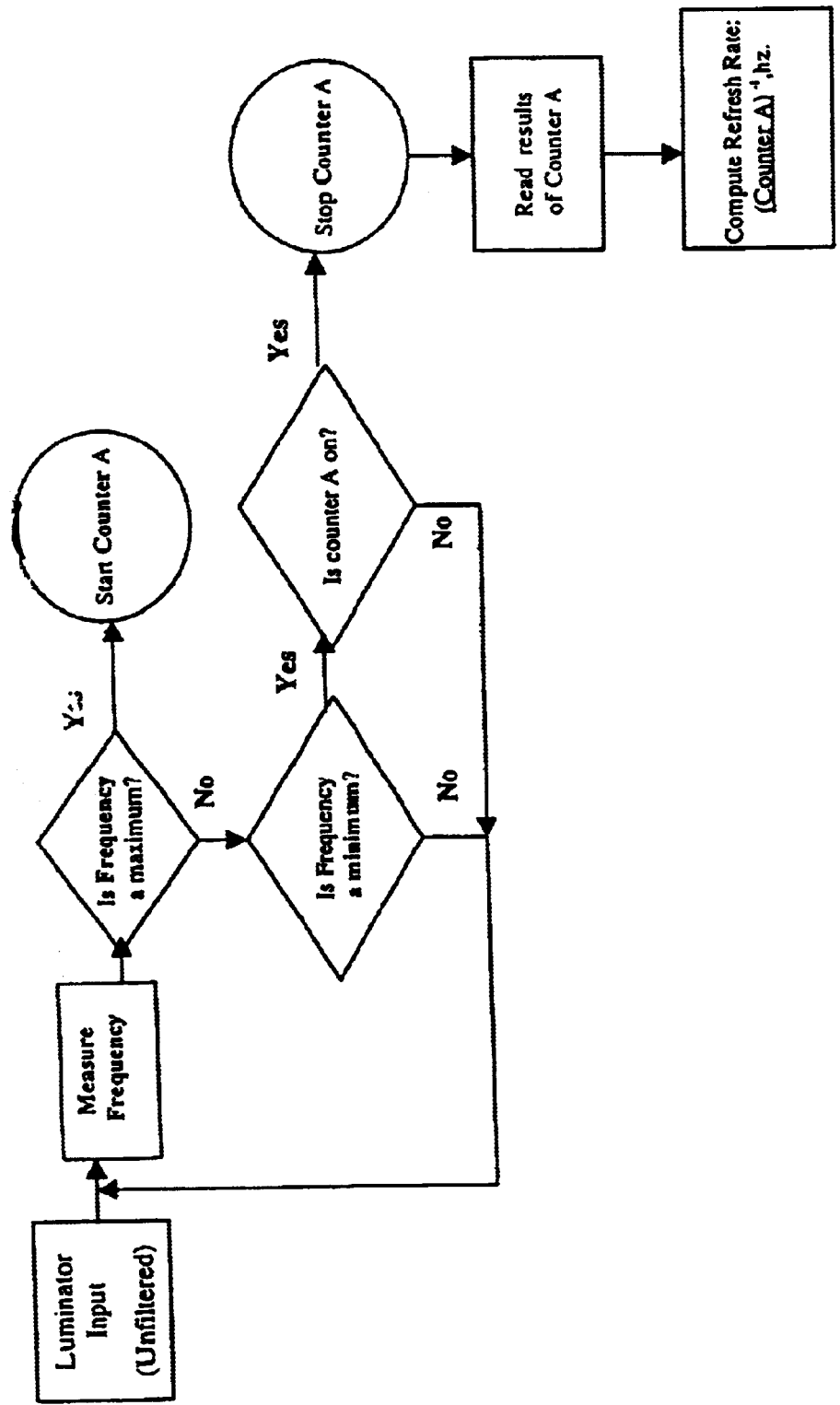
FIG. 11 is a flow chart illustrating programming of the microprocessor shown in FIG. 10 to obtain refresh rate probes.

Referring to FIGS. 6 and 7, it will be observed that the photodetectors have Ions elements 56 in front of the photodiodes thereof which enhance the amount of light collected (i.e., passing via the filter elements in the filter pack 50. By virtue of the shapes and spatial relationship of the board 32 and the wall 18, when the colorimeter is held on the screen of the monitor, or other source, from which light emanates and the apertures have their longitudinal axes approximately 45° to the horizontal, the apertures 20 subtend arcs of 30° (plus or minus 15°) along the vertical and 44° (plus or minus 22°) along the horizontal The light from vertically spaced regions is therefore masked as shown by the curve 58 in FIG. 6 so as to prevent, nt only crosstalk between light passing through different ones of the Apertures, but also passing of light of modified color due to vertical spacing to the photodetectors 38. This is an advantage when screens of the type which exhibit color changes, such as of LCD displays, are being measured and/or calibrated The colorimetry system is shown in FIG. 10. This figure also shows how the calorimeter is used for calibrating a monitor so as to provide accurate color and gamma, in accordance with the CIE XYZ color system. The colorimeter system may be adapted to utilize other color systems such as the CIE L*a*b* and the CIE Lab color systems, if desired. The monitor under test may be a cathode ray tube monitor or an LCD monitor or display. In the event that a cathode ray tube monitor is used, it is desirable to make measurements over a large number, say 40 or more, refresh cycles or frames of the image. To that end, the refresh rate is detected in a microprocessor 60 of the system which may be programmed as shown in the flowchart of FIG. 11. An area or patch of the monitor screen equal to the area of the wall 18 carrying the apertures (for example 1 inch square) is exposed to light from the monitor. The light passes through the edge filters of the pack 50 into the detectors 38. The detectors provide a digital output in the form of a pulse train of rate which depends upon the light intensity. By collecting or counting the pulses over intervals of time which may be related to the refresh rate, in the case of cathode ray tube monitors, digital outputs representing the light passing through each edge filter, as well as the unfiltered light, is obtained. The detectors 38 have their outputs multiplexed by a multiplexer 62 which provide trains of pulses sequentially over like intervals as provided for by the channel selector output from the microprocessor 60. The unfiltered light from the 8th detector 38 provides an output which is used for detecting refresh rate, as well as an effective edge filter output, which is used in synthesizing the response mimicking the CIE color system, namely the color matching functions. The microprocessor is connected to a host computer and particularly the CPU 64 thereof by a communications link such as the USB (Universal Serial Bus) or other communications link, for example an RS232 bus. The CPU 64 may communicate with the microprocessor 60 in order to retrieve the color measurements.

In calibrating the monitor, the CPU may first flash an all-red screen and instruct the microprocessor to extract spectral data. The CPU may then present entirely green, then blue screens, as well as multiple levels of a gray screen, varying from completely dark (red, green and blue controls at maximum).

Referring to FIG. 11, the refresh rate is obtained from the 8th detector output. The frequency or pulse repetition rate of the detector output is measured. When the rate reaches a maximum (when the first dip in the rate occurs), a counter A is started. The frequency continues to be measured until there is a rise in count rate, indicating a frequency or rate minimum. Then the counter is stopped. The refresh rate is thus detected at the high and low luminosity from the screen. This refresh rate may be used to control the sampling window of the multiplexer as well as to collect counts from each of the detectors during the colorimetry process.

Figure 12:
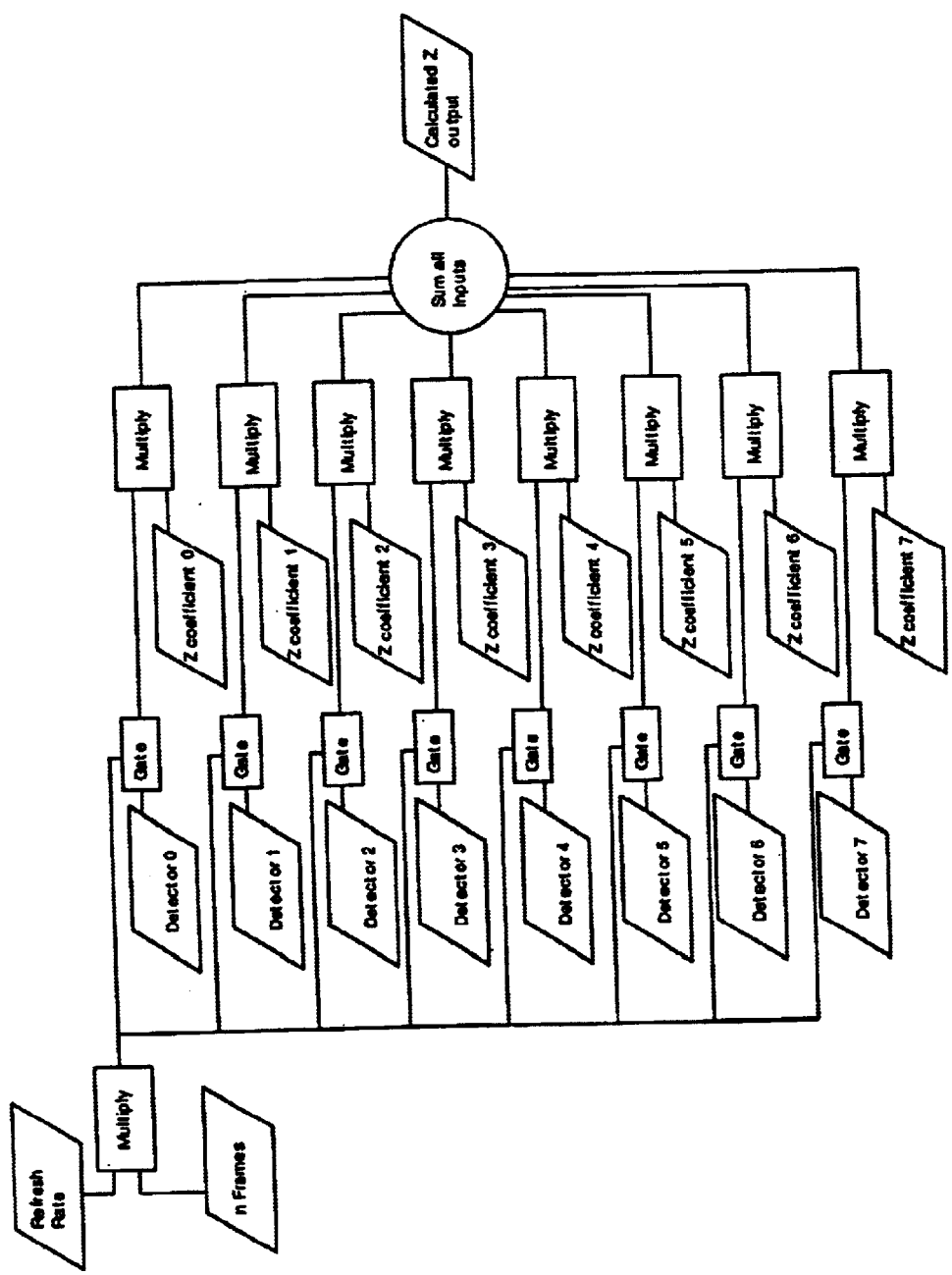
FIG. 12 is a flow chart illustrating the programming of the microprocessor to synthesize the response of the colorimeter and provide a response mimicking the CIE color matching functions.

FIG. 12 shows how the microprocessor 60 is programmed to mimic the z color matching function. The other color matching functions may be obtained by a similar program. The program uses different coefficients for the x, y and z functions. The computations carry out the equations set forth below for each filter detector pair, including the filter detector pair F/DO which passes essentially the entire visible spectrum, while the other filter detector pairs pass successively smaller wavelength regions at the upper end of the spectrum. The regions are overlapping in that the portion of the spectrum passed by the upper edge filter detector pair of the 7th band (channel CHN-7) is overlapped, while only the first band (channel CHN-1) is overlapped by the unfiltered band or channel (CHN-0), that is the output from the F/DO filter detector pair. The table of coefficients is, in general, set forth as the following table. It is a two-dimensional array of numbers stored in the microprocessor 60. These numbers are used as the coefficients in the algorithm set forth in the equations given below.

A two-dimensional array of numbers is stored in the microprocessor. These numbers are to be used as coefficients $C_{an}^*$ in the algorithm. They are:

| N | X | Y | Z |
| --- | --- | --- | --- |
| F/D0 | C/X0 | CY0 | CZ0 |
| F/D1 | CX1 | CY1 | CZ1 |
| F/D2 | CX2 | CY2 | CZ2 |
| F/D3 | CX3 | CY3 | CZ3 |
| F/D4 | CX4 | CY4 | CZ4 |
| F/D5 | CX5 | CY5 | CZ5 |
| F/D6 | CX6 | CY6 | CZ6 |
| F/D7 | CX7 | CY7 | CZ7 |

$\bar{X}(\lambda) = FD_0^* C_{X0} + FD_1^* C_{X1} + FD_2^* C_{X2} \ldots + FD_7^* C_{Y7}$ $\bar{Y}(\lambda) = FD_0^* C_{Y0} + FD_1^* C_{Y1} + FD_2^* C_{Y2} \ldots + FD_7^* C_{Y7}$ $\bar{Z}(\lambda) = FD_0^* C_{Z0} + FD_1^* C_{Z1} + FD_2^* C_{Z2} + FD_7^* C_{Z7}$   ALGORITHM M The coefficients are derived by a least mean square fit to the color matching functions. The methodology which is used is described in a paper by D. O. Wharmby, entitled "Improvements in the Use of Filter Colorimeters" which appeared in the *Journal of Physics* E: Scientific Instruments, 1975, Vol. 8, pages 41–44. In the Wharmby article, an attempt was made to mimic the functions using only six band pass filters. In accordance with the present invention, long pass or edge filters are used, which not only make the response which is precisely mimicked, but also enables the use of low cost edge filters, rather than band pass filters to pass the red, green and blue portions of the spectrum, respectively. The use of long-pass filters allows the freedom to select individual filters to match individual slopes of the CIE x y z (bar) curves. In contrast, a band-pass filter set forces one to make compromises on one slope to try to match a different slope of the same function.

Figure 14:
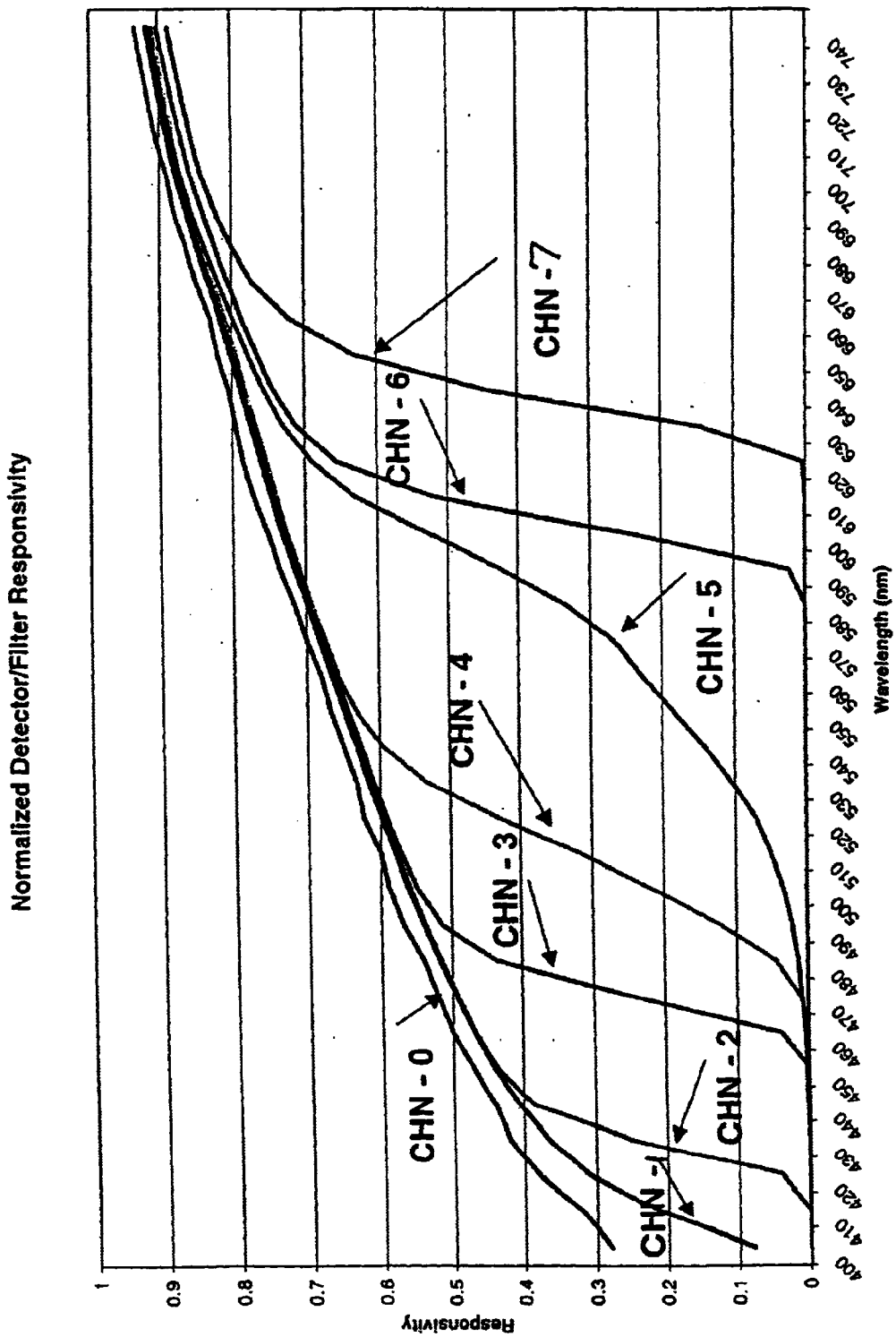

The following table indicates the coefficients which have been found suitable for filter detector pairs having the responsivities shown in FIG. 14.

| Example of Coefficients | | |
| --- | --- | --- |
| CX0 = −0.00097 | CY0 = −0.00049 | CZ0 = −0.0109 |
| CX1 = 0.00961 | CY1 = 0.00019 | CZ1 = 0.07038 |
| CX2 = 0.03507 | CY2 = 0.0036 | CZ2 = 0.15586 |
| CX3 = −0.044 | CY3 = 0.00214 | CZ3 = −0.15754 |
| CX4 = −0.01173 | CY4 = 0.07195 | CZ4 = −0.07174 |
| CX5 = 0.13641 | CY5 = −0.05846 | CZ5 = 0.03593 |

-continued

Example of Coefficients

| CX6 = −0.06319 | CY6 = −0.01143 | CZ6 = −0.01658 |
| CX7 = −0.05372 | CY7 = −0.0134 | CZ7 = 0.0009 |

Figure 13:
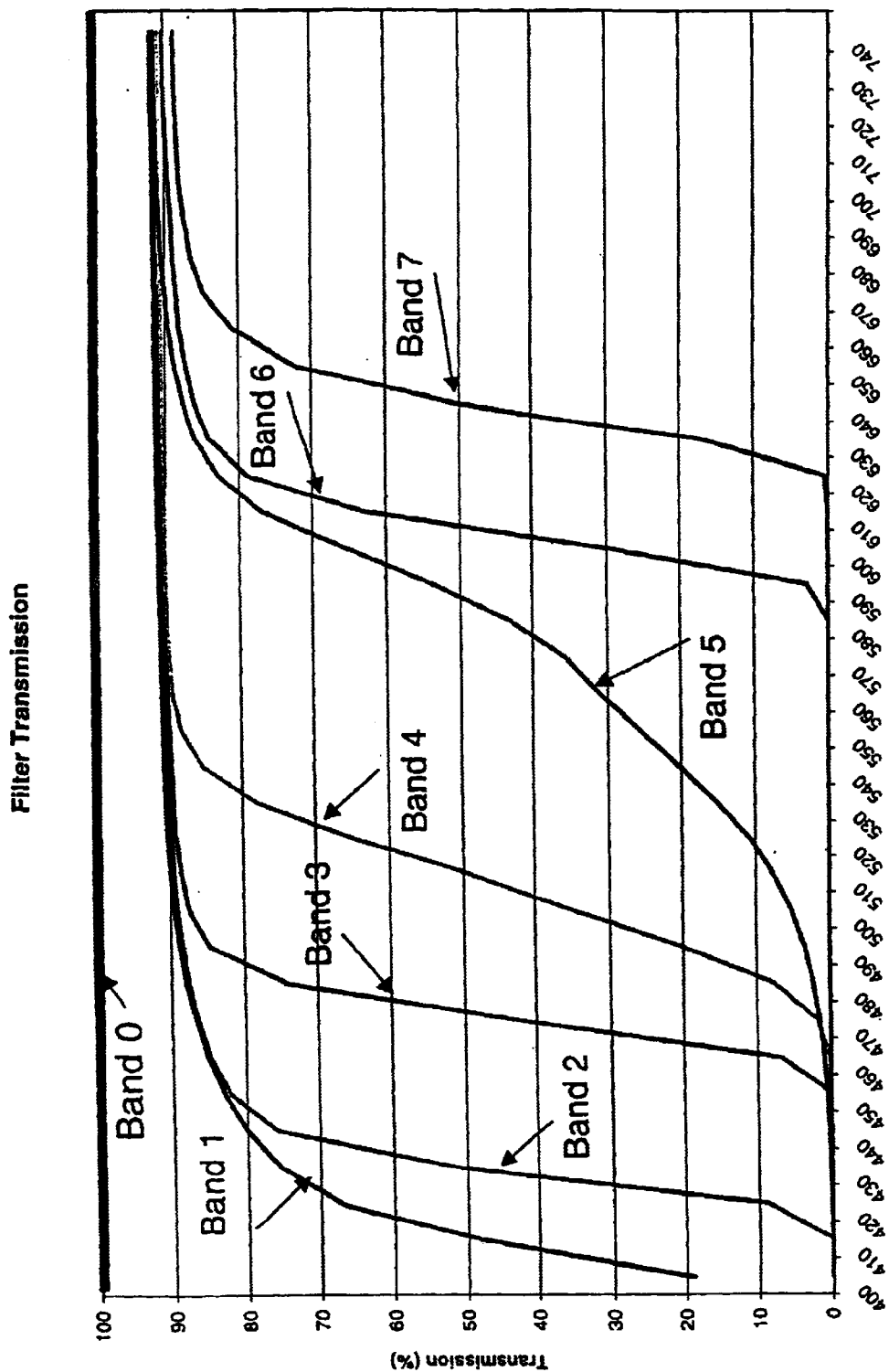
FIGS. 13, 14 and 15 are curves illustrating the filter transmisivity over the spectrum, the detector filter pair responsivity over the spectrum and the accuracy of mimicking the responsivity to the color matching functions.
Figure 15:
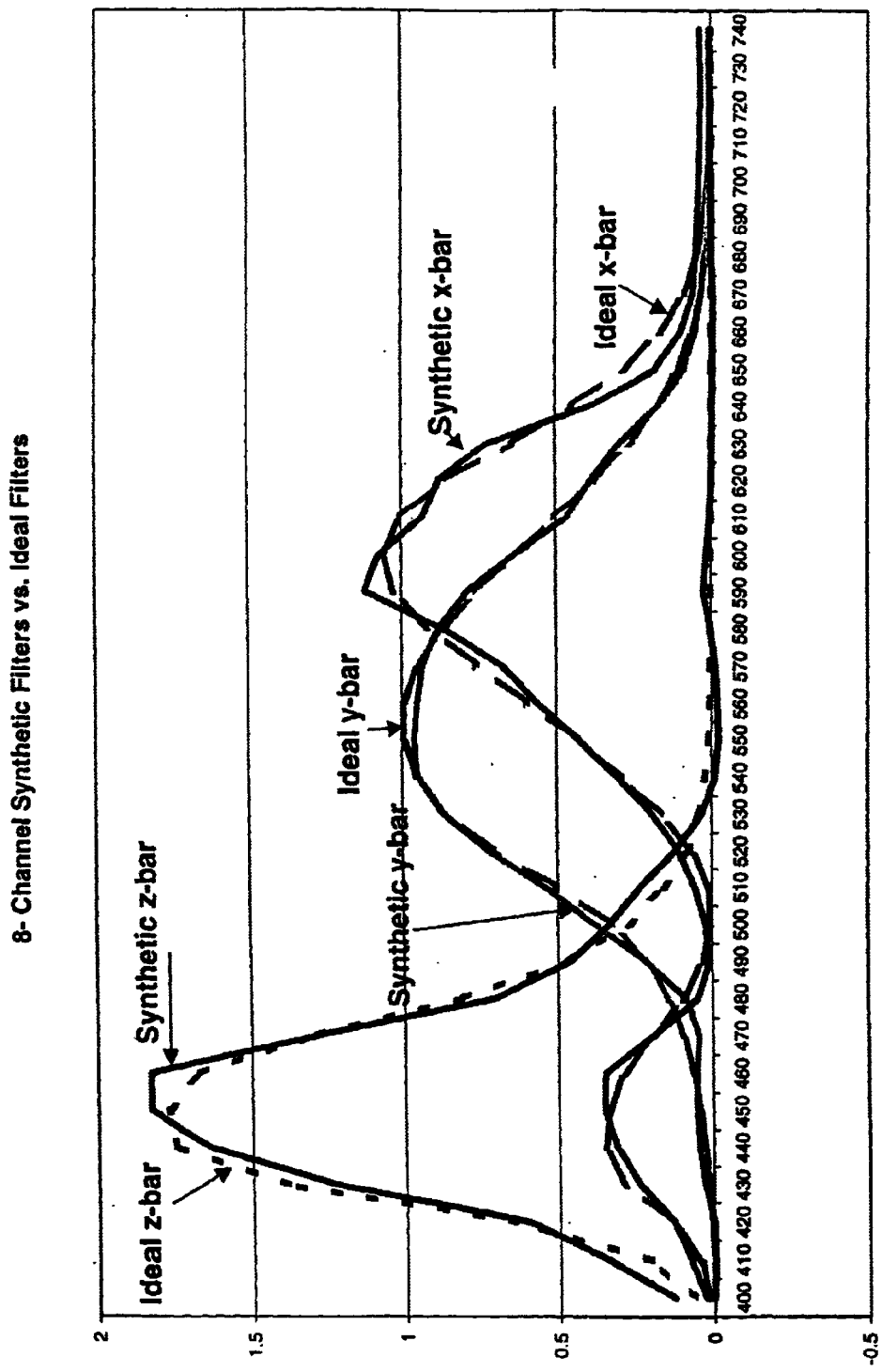

The response of the edge filters is shown in FIG. 13 for the unfiltered band and the band passed through the various filters in the filter pack 50. The slope of the skirts (rising edges) particularly for band 4 and 5, have been selected to facilitate the derivation of the coefficients to accurately mimic the color matching functions. The color matching functions are shown in FIG. 15 and the accuracy of the synthesized color matching functions (that is, how they compare to the ideal color matching functions) is shown in FIG. 15.

FIG. 14 illustrates the responsivity of the filter detector pairs. The detector imposes its own responsivity on the output which is obtained via the filters. The affect of the detector responsivity is that the filter/detector pair responsivity is the product of the detector responsivity with the filter transmission characteristics.

Figure 16:
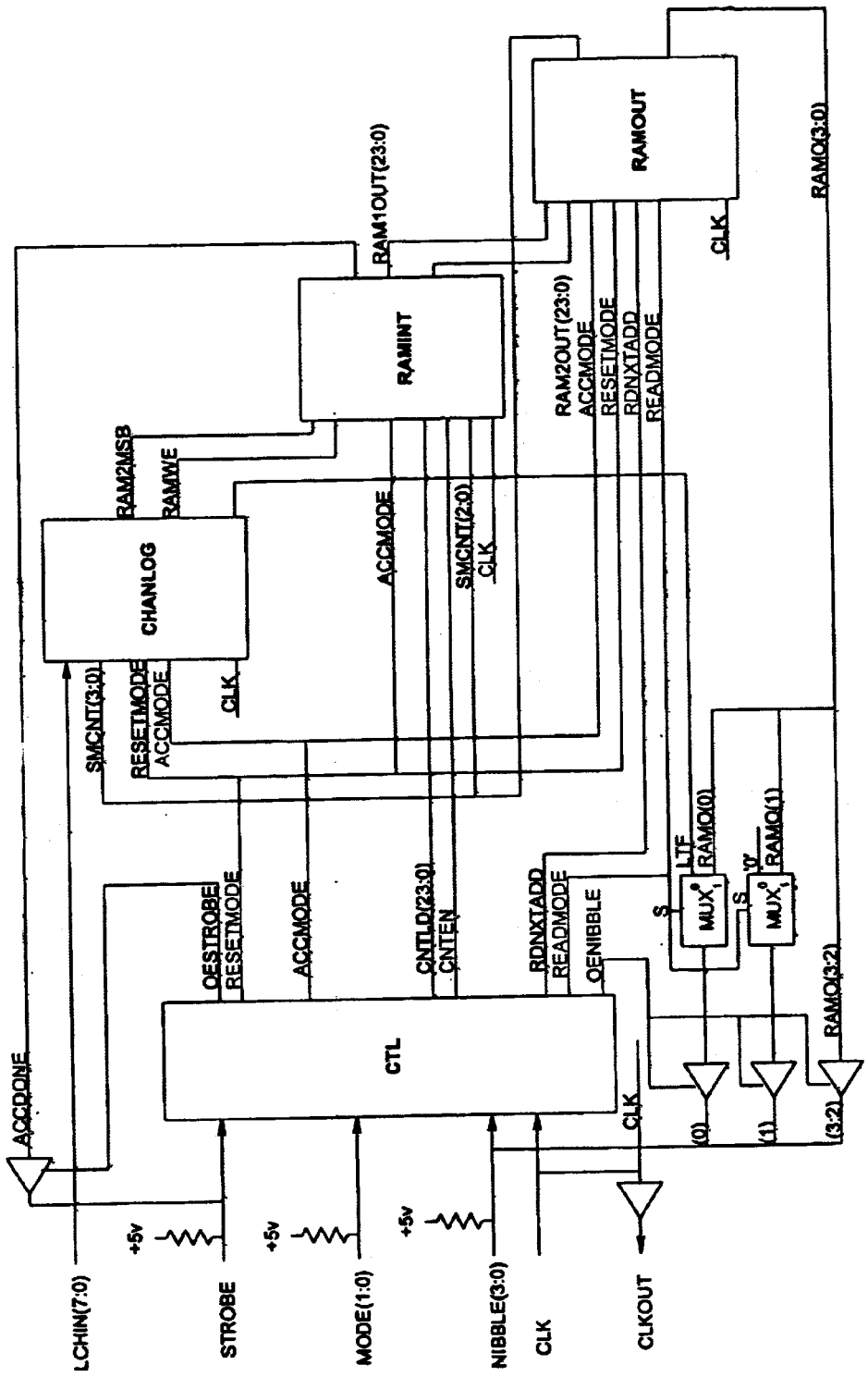
FIG. 16 is a diagram of a controller including a field programmable gate array for reading data in parallel from the colorimeter.

With reference to FIG. 16, another embodiment of the present invention is shown including a field programmable gate array. In particular, the calorimeter includes a field programmable gate array for reading data from the plurality of filter/photodetector pairs in parallel. It will be appreciated that the present invention will also find application to other color measuring devices such as spectrophotometers.

The colorimeter includes a unique circuit comprised of an FPGA (field programmable gate array) and a microprocessor that is programmed for the specific purpose of reading multiple photodetectors in parallel. This application has proven to speed the process of reading filter/photodetector pairs by a factor N, where N=the number of photodetectors to be read. The data collected from the reading of the filter/photodetector pairs is directly translated into colormetric information.

The primary board function is color measurement The FPGA device (as shown in FIG. 16) (for example, manufactured by Xilinx, Inc.) is directed by the microcontroller on this board. The communication between the microcontroller and this device includes a 2-bit Mode Bus, a 4-bit Nibble Bus and a Strobe.

The FPGA device receives eight (8) Light to Frequency pulse trains (LTF) from the photodetectors. Of course, any number can be used based on the number of data channels. The primary function of the device is to count the number of pulses which occur on each of the 8 channels during a specified period of time. This time period is a 24-bit value loaded into a counter from the microcontroller across the Nibble Bus in 4-bit bytes. This device will also record the value of the count for each of the channels when the first pulse occurs and the last pulse occurs within this time period. The device will, when commanded by the microcontroller, provide the information collected on the 8 pulse trains back to the microcontroller on the Nibble Bus.

There are four modes of operation as indicated by the Mode Bus. The first mode driven by the microcontroller is Write (Mode=01). In this mode, the microcontroller loads the counter with the measurement time period. The value is 24 bits and is loaded starting with the 4-bit most significant nibble. The value on the Nibble Bus is registered with the rising edge of Strobe. Six Strobes are issued to load the entire word most significant nibble to least significant nibble. The software instruction sequence following the mode change to write drives strobe low, drives the nibble bus to the next counter 4-bit load value, and drives strobe high for a total of 6 writes.

After the counter is loaded, the Mode Bus will indicate Other Mode (Mode=11). In this mode, one of the LTF channels (TBD) is registered by the FPGA and driven onto the least significant bit of the Nibble Bus. Nibble Bus (1) is driven low during this mode. The FPGA continues to drive the Nibble Bus in this mode until the Mode is changed.

After the microcontroller has collected information on this LTF, it drives the Mode to Accumulate (Mode=10). In this mode, the FPGA stores the number of pulses which occur on each of the 8 channels. It also stores the counter value of the first pulse on each channel and the last pulse on each channel. There are three 24-bit words stored for each channel. In this mode, the FPGA drives the Strobe line. Strobe is driven high until the counter, loaded with the measurement time period, counts down to zero. The counter is enabled to count every sixth clock. The Strobe is then driven low until the mode is changed. Of course, the timing can be changed based on desired specifications. In the other three (3) modes, Strobe is an input.

When the microcontroller sees that the Accumulate Mode has completed as indicated by Strobe going low, it then drives the mode to Read Mode (Mode=00). In this mode, the device drives the Nibble Bus. It provides the microcontroller with data it collected during Accumulate Mode. The first data read out is the count value of the first pulse starting with channel 0 through 7. The next data read out is the count value of the last pulse sting with channel 0 through 7. The last data read out is the number of pulses occurring during the time period starting with channel 0 and ending with channel 7. There are 24 words of data, 3 words per channel for 8 channels. Each word is read in six 4-bit nibbles starting with the least significant nibble. One nibble is read each time the Strobe is dropped low and raised. The device updates to the next nibble on the rising edge of Strobe. There are 144 nibbles read during Read Mode (24 words times 6 nibbles). The FPGA continues to drive the Nibble Bus until the mode is changed. The software instruction sequence following the mode change to Read Mode is drive Strobe low, read Nibble Bus, drive Strobe high for 144 reads.

TABLE

Pin Assignments - TBD

| Signal Name | I/O | Pin Assignment | Description |
| --- | --- | --- | --- |
| CLK | I | P48 | FPGA Operating Clock (6 MHz) |
| LCHIN7 | I | P83 | Light to Frequency pulse train, channels 7 through 0 |
| LCHIN6 | I | P78 | |
| LCHIN5 | I | P81 | |
| LCHIN4 | I | P82 | |
| LCHIN3 | I | P94 | |
| LCHIN2 | I | P95 | |
| LCHIN1 | I | P96 | |
| LCHIN0 | I | P97 | |
| MODE1 | I | P72 | Mode of Operation: |
| MODE0 | I | P56 | 00 Read, 01 Write, 10 Accumulate, 11 Other |
| STROBE | I/O | P54 | Strobe: Input in Write, Read and other modes, Output in Accumulate mode |
| NIBBLE3 | I/O | P66 | Nibble: 4-bit Bus between |
| NIBBLE2 | I/O | P67 | microcontroller and FPGA. Input |
| NIBBLE1 | I/O | P69 | in Write and Accumulate modes, |
| NIBBLE0 | I/O | P70 | Output in Read and Other modes. |
| CCLK | I | P56 | Programming Clock |

TABLE-continued

Pin Assignments - TBD

| Signal Name | I/O | Pin Assignment | Description |
| --- | --- | --- | --- |
| DIN | I | P72 | Program Data |
| CLKOUT | O | P21 | Input Clock driven out |

With further reference to FIG. 16, The FPGA is divided into four blocks: Control (CTL), Channel Logic (CHANLOG), RAM Interface (RAMINT), and RAM output (RAMOUT). The following sections will describe each of these blocks. CTL provides control to the other logic blocks. CHANLOG captures the 8 LTFs and generates write enables to RAM. RAMINT has the RAM logic used to store the LTF information and RAMOUT controls the RAM output during Read Mode.

CLK input is driven out on CLKOUT for test purposes. Pullups are provided on the Mode, Nibble and Strobe signals.

CTL Block

CTL accepts the Mode inputs. These are registered first to handle any metastble condition resulting from clocking between the microcontroller and the FPGA. Because there are no specifications on clock to output of the microcontroller and to ensure the mode is not registered It incorrectly, the mode is present for 2 clock periods before the internal mode register is updated to reflect the new mode. When a new mode is registered, a Resetmode is issued to control logic throughout the device.

The Strobe is also input to CTL. The Strobe is first registered to handle any metastable condition then registered twice to form rising and failing edge indicators. The rising edge indication in Read Mode causes the RAM addressing to the next nibble to be advanced. When reading the RAM data, the data output is valid while the strobe is low, with the next value becoming available during the third clock period following the rising edge of Strobe.

CTL also receives the Nibble Bus. The rising edge of Strobe in Write Mode causes the Nibble Bus to be written into the least significant nibble of the counter parallel load register. This register is a shift register which shifts in 4-bit increments. When the rising edge of Strobe occurs, each lower nibble shifts its data into the next highest nibble. The value is loaded by shifting in the most significant nibble first, down to the least significant nibble. CTL provides this measurement period value to RAMINT which loads the value into the counter whenever a Resetmode occurs. Note that the measurement period being loaded during write mode from the Nibble Bus, is expected to remain on the bus three clock periods following the rising edge Strobe. The software sequence for writing the measurement period would be to drive strobe low, drive nibble bus, drive strobe high.

Along with providing the value to load into the counter, CTL provides a count enable which, during Accumulate Mode, allows the counter to decrement every sixth clock. The logic generating this enable is reset with Resetmode.

CTL also provides mode indicators to the other blocks decoded from the internal mode register. It also provides the tristate enables for Strobe and the Nibble Bus. Strobe is driven from this device during Accumulate Mode and tristated otherwise. The Nibble Bus is driven during Other Mode and Read Mode and tristated in the other two modes.

CHANLOG Block

CHANLOG accepts the 8 LTF channels. It first registers the 8 channels to remove any metastable condition. The channels are then registered twice to form a rising edge detection. This edge detection is registered into an 8-bit increment register (ICH). This register is cleared with Resetmode which indicates the start of the mode. A one in bit 0 indicates that a pulse has occurred in channel 0. A one in bit 1 indicates that a pulse has occurred in channel 1. And so on, up through bit 7 of ICH indicating a pulse has occurred in channel 7.

The pulses are issued no faster than 1 pulse every 2 usec. The FPGA operates on a 6 MHz clock. A 1 in the ICH register enables a write to RAM (see RAMINT Block). Each channel is enabled during one of 8 clock periods (cycles) to generate a write enable to the RAM. ICH(0) is enabled during Cycle 0, ICH(1) during Cycle 1, up through ICH(7) which is enabled to write during Cycle 7. Each channel has an opportunity to indicate an edge detection once every 1.33 usec (6 MHz (=167 ns.) times 8) which is within the 2 usec requirement Cycle is an 8-bit decode generated from the 3 least significant bits of a counter (SMCNT) which is reset by Resetmode (see RAMOUT).

The cycle indicator also causes the appropriate ICH register bit to be reset in the clock period following its usage as a write enable to the RAM. This allows the next pulse to be detected. The cycle indicator also prevents the two registers capturing the pulse from registering so an edge will not be lost while the ICH register bit associated with that cycle is cleared.

CHANLOG also outputs the most significant address bit to RAM2 of RAMINT. In Accumulate Mode, this bit is formed from an 8-bit register (FCH), one for each channel, with one bit selected for output to RAMINT based on Cycle. A specific bit in FCH is set when the first pulse has occurred for that channel and write enable has been issued to RAMINT. FCH is reset with Resetmode forcing the lower addresses of RAM2 to store the time of the fist pulse. The upper addresses will store the time of the last pulse (see RAMINT). During Read Mode, the most significant address bit is bit 3 of SMCNT (see RAMOUT).

CHANLOG also registers LTF (TBD) twice, once to remove the metastable condition. The output of the second register is driven onto Nibble Bus (0) during Other Mode. Nibble Bus (1) is driven low during Other Mode.

RAMINT

RAMINT includes two 24-bit wide RAMS (RAM1 and RAM2). The input to RAM1 is its output plus one. During Accumulate Mode, this RAM keeps track of the number of pulses on each channel with address 0 mapping to LTF 0, through address 7 mapping to LTF 7. The addressing to the RAM is provided by the 3 least significant bits of SMCNT (see RAMOUT). The write enable to this RAM, active when a pulse has been detected for that cycle's channel, is provided by CHANLOG. This RAM is cleared at power up but is not reset between Accumulate Modes and therefore, software must keep track of the last values of pulse count for each of the channels to determine the actual count for that time period.

The data input to RAM2 is a 24-bit counter which is loaded when Resetmode occurs with the measurement time period provided by CTL. In Accumulate Mode, this counter is enabled by CTL to decrement every sixth clock. The value of the counter is written into RAM2, at the same time RAM1 is written, when it is enabled by CHANLOG. The lower 8 addresses store the value of the counter when the first pulse is detected. The upper eight addresses store the value of the counter when the last pulse is detected. The 3 least significant bits of the address are SMCNT(2:0) with the most significant bit provided by CHANLOG and is a function of mode.

Strobe is driven high during Accumulate Mode until the counter counts down to zero and SMCNT(2:0) equals 7. Writes to the RAMs are then disabled. Waiting for SMCNT (2:0) to equal 7 following the counter counting down to zero allows information to be collected on all 8 channels before disabling writes. RAMINT then forces Strobe low, in Accumulate Mode, indicating that the mode has completed.

RAMINT provides the outputs of RAM1 and RAM2 to RAMOUT for output during Read Mode.

RAMOUT

RAMOUT provides the control for outputting the RAM data during Read Mode. While CTL provides the tristate enable to the Nibble Bus (driving in Read and Other modes), RAMOUT controls which of twelve 4-bit nibbles to output onto the Nibble Bus. It also generates the SMCNT which is reset at the start of a new mode (Resetmode). SMCNT provides to addressing to the RAMs and is used to generate the cycle indicator (see CHANLOG).

RAMOUT generates a 3-bit counter (CNTLOW) that counts from 0 to 5 and is used to select one of six nibbles per word that is output on the Nibble Bus during Read Mode. This counter is incremented on the rising edge of Strobe in Read Mode.

SMCNT is a 5-bit counter which in Accumulate Mode counts every clock. Each clock a different channel is being addressed in the RAMs. In Read Mode the counter increments only if CNTLOW=5 and a rising edge of Strobe occurs. This condition advances the RAM address to the next word. Only after all six nibbles of a word have been read does this counter advance to address the next word. During Read Mode, when SMCNT(4) is set RAM1 is accessed and when 0 RAM2 is accessed. Therefore, all 16 words of RAM2 are read out (SMCNT=0 through 15) followed by the 8 words of RAM1 (SMCNT=16 through 23). A total of 144 4-bit nibbles are output. The data on the Nibble Bus changes approximately 3 clocks following the rising edge of Strobe. The software sequence for reading RAM would be to drive strobe low, read, drive strobe high.

The design is targetted to a SpartanXL XCS05XL device. There are 36 4-input LUTs, 68 3-input LUTs, 18 CLB flops and 40 IOB flops available.

In accordance with another embodiment of the present invention, an attachment or connecting mechanism for the optical assembly is provided without needing fasteners or adhesives.

The calorimeter includes an optical assembly which manages light to the filter/photodetector pairs. The plastic housing is designed in such a way as to a) automatically align the optical assembly in relationship to the printed circuit board (PCB) and assembly; b) Securely hold the optical assembly in a 2D relationship to items in "a"; and c) Securely hold the optical assembly in a 1D (distance) relationship to the PCB assembly and detectors. See cross section illustration.

With this attachment, accurate and secure positioning of an optical assembly using the plastic injection housing designed for the instrument is acheived. This eliminates the need for fasteners or adhesives, and reduces assembly time.

Figure 17:
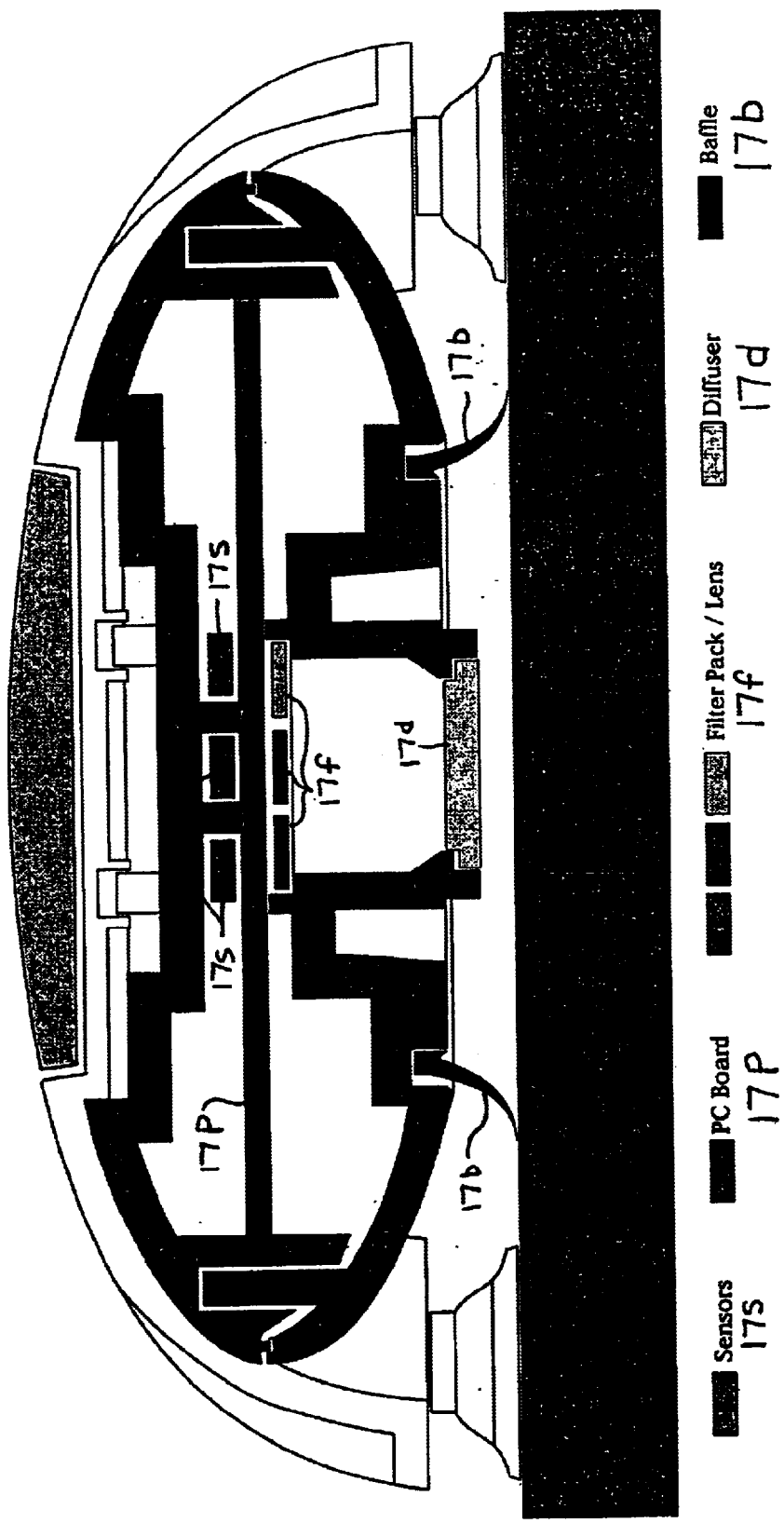
FIG. 17 is a cross section of the calorimeter housing in another embodiment of the present invention.

With reference to FIG. 17, the housing for the colorimeter is designed in such a way as to eliminate the need for fasteners or adhesives. Specifically, the plastic injection housing contains a plurality of pins that interlock with each other when engaged. The engagement of the pins automatically aligns the two halves of the device housing and locks the assembly.

The colorimeter includes a light diffuser which is pressed into an opening that interferes with the diameter of the diffuser. This interference fit accurately positions the diffuser and holds it securely in position.

From the foregoing description, it will be apparent that there has been provided improved technology in colorimetry and particularly and improved digital colorimeter. Variations and modifications in the herein described colorimeter and its method of operation will undoubtedly suggest themselves to those skilled in the art. Accordingly, the foregoing description should be taken as illustrative and not in a limiting sense.

We claim:

1. A color measuring device comprising:

a housing;

a plurality of photodetectors for generating data in response to sensed light;

a field programmable gate array for reading the data from the plurality of photodetectors in parallel; and a plurality of optical filters each being paired with one of the plurality of photodetectors, each of the filter/photodetector pairs having a responsivity which extends over different overlapping wavelength regions at longer wavelength ends of a visible spectrum.

2. The color measuring device as set forth in claim 1 further comprising a translator converting the responsivity of said pairs into a responsivity mimicking a color matching function from which a tri stimulus value can be provided when said pairs are exposed to light to be colormetrically measured.

3. The color measuring device as set forth in claim 1 wherein said filter/photodetector pairs provide a plurality of long wavelength pass electro optical filters.

4. The color measuring device as set forth in claim 1 wherein said filter/photodetector pairs are disposed in an array.

5. The color measuring device as set forth in claim 1 wherein one of said filter/photodetector pairs has a responsivity extending over an entire visible spectrum.

6. The color measuring device as set forth in claim 1 wherein said filter/photodetector pairs provide a plurality of long-wavelength-pass electro-optical filters.

7. The color measuring device as set forth in claim 1 wherein said filter/photodetector pairs are disposed in an array.

8. The color measuring device as set forth in claim 1 wherein one of said filter/photodetector pairs has a responsivity extending over an entire visible spectrum.

9. A colorimeter for measuring color temperature comprising:

a plurality of filter/photodetector pairs, each having a responsivity which extends over different overlapping wavelength regions at longer wavelength ends of a spectrum, a color temperature of which is to be measured by said colorimeter;

a field programmable gate array programmed to accumulate the responsivity from each of the plurality of filter/photodetector pairs in parallel; and a translator converting the responsivity into a responsivity mimicking a color matching function from which values can be provided representing said color temperature.

10. The colorimeter according to claim 9 wherein said spectrum is from an emissive source.

11. The calorimeter according to claim 10 wherein said emissive source includes one of a light source, a video display, a radiating body and a black body.

12. The calorimeter according to claim 9 wherein the field programmable gate array includes:

means for receiving the responsivity from each of the plurality of filter/photodetector pairs in parallel;

means for accumulating the responsivity over a predetermined time period; and means for outputting the responsivity accumulated.

13. A process for measuring a color of an object comprising the steps of:

filtering light from the object with a plurality of filters responsive across overlapping wavelength regions at longer wavelengths of the visible spectrum;

detecting the filtered light and generating a plurality of light signals representative of the filtered light detected;

reading the plurality of light signals into a field programmable gate array in parallel;

wherein the reading includes accumulating the plurality of light signals for a selected time period; and generating output signals based on the plurality of light signals read which represent the color of the object.

* * * * *